US012345530B2

(12) United States Patent
Wu et al.

(10) Patent No.: US 12,345,530 B2
(45) Date of Patent: Jul. 1, 2025

(54) PHOTONICS GYROSCOPE WITH BROADBAND LIGHT SOURCE

(71) Applicant: Honeywell International Inc., Charlotte, NC (US)

(72) Inventors: Jianfeng Wu, Tucson, AZ (US); Tiequn Qiu, Glendale, AZ (US); Matthew Wade Puckett, Phoenix, AZ (US); Steven Tin, Edina, MN (US); Glen A. Sanders, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 183 days.

(21) Appl. No.: 18/193,448

(22) Filed: Mar. 30, 2023

(65) Prior Publication Data

US 2024/0328783 A1    Oct. 3, 2024

(51) Int. Cl.
*G01C 19/72* (2006.01)
*H01S 3/00* (2006.01)

(52) U.S. Cl.
CPC ......... *G01C 19/727* (2013.01); *G01C 19/722* (2013.01); *H01S 3/0071* (2013.01)

(58) Field of Classification Search
CPC .... G01C 19/727; G01C 19/722; H01S 3/0071
See application file for complete search history.

(56) References Cited

U.S. PATENT DOCUMENTS

| 5,327,215 A | 7/1994 | Bernard et al. |
| 7,619,743 B2 | 11/2009 | Digonnet et al. |
| 7,738,109 B2 | 6/2010 | Digonnet |
| 8,289,521 B2 | 10/2012 | Blin et al. |
| 8,744,222 B2 | 6/2014 | Lee et al. |
| 9,121,708 B1 * | 9/2015 | Qiu .................. G01C 19/723 |

(Continued)

FOREIGN PATENT DOCUMENTS

WO    2021186357 A1    9/2021

OTHER PUBLICATIONS

European Patent Office, "Extended European Search Report", dated Sep. 4, 2024, from EP Application No. 24161512.9, from Foreign Counterpart to U.S. Appl. No. 18/193,448, pp. 1 through 11, Published: EP.

(Continued)

*Primary Examiner* — Tarifur R Chowdhury
*Assistant Examiner* — Kaitlyn E Kidwell
(74) *Attorney, Agent, or Firm* — Fogg & Powers LLC

(57) ABSTRACT

A photonics gyroscope comprises a light source on a photonics chip that emits a broadband beam; a waveguide resonator; a reflective component; first and second detectors, the second detector coupled to the source; a RIN servo loop coupled between the second detector and the source; and a rate calculation unit. The beam is directed into the resonator such that it propagates in a CCW direction. A portion of the CCW beam is coupled out of the resonator toward the reflective component and reflected back as a reflected beam that is coupled into the resonator such that the reflected beam propagates in a CW direction. The CW beam is coupled out of the resonator to the first detector, which detects a resonance frequency shift between the CW and CCW beams. The RIN servo loop stabilizes an intensity of the beam such that bias error and noise is reduced.

19 Claims, 2 Drawing Sheets

(56) References Cited

U.S. PATENT DOCUMENTS

| | | | |
|---|---|---|---|
| 10,228,250 | B2 | 3/2019 | Chamoun et al. |
| 10,274,319 | B2 | 4/2019 | Wang |
| 10,852,137 | B2 | 12/2020 | Bischel et al. |
| 11,199,407 | B2 | 12/2021 | Paniccia et al. |
| 11,231,278 | B1 | 1/2022 | Digonnet et al. |
| 2004/0061863 | A1 | 4/2004 | Digonnet |
| 2017/0067743 | A1* | 3/2017 | Salit ................. G01C 19/66 |
| 2018/0259337 | A1* | 9/2018 | Wang ................. G02B 6/4216 |
| 2018/0274926 | A1 | 9/2018 | Wang |
| 2018/0314007 | A1 | 11/2018 | Feke et al. |
| 2022/0187074 | A1 | 6/2022 | Lam et al. |
| 2022/0260373 | A1 | 8/2022 | Paniccia et al. |

OTHER PUBLICATIONS

Liu et al., "Performance of a resonant fiber-optic gyroscope based on a broadband source", Applied Optics, May 27, 2022, vol. 61, No. 16, pp. 4971 through 4979.

Liu et al., "Reduction of relative intensity noise in a broadband source-driven RFOG using a high-frequency modulation technique", Optics Letter, Sep. 27, 2022, vol. 47, No. 19, pp. 5100 through 5103.

Zhao et al., "White-light-driven resonant fiber-optic gyro based on round trip filtering scheme", Optics Letters, Feb. 22, 20222, vol. 47, No. 5, pp. 1137 through 1140.

* cited by examiner

PHOTONICS GYROSCOPE WITH BROADBAND LIGHT SOURCE

BACKGROUND

The resonant optical gyroscope often requires narrow linewidth lasers for rate interrogation. One or multiple narrow linewidth lasers can be used to lock to the cavity resonances in the gyroscope. The rotation rate is determined by comparing the resonance shift between clockwise (CW) and counter-clockwise (CCW) beam directions. This narrow linewidth gyroscope system is expensive and complicated. In addition, the system bias performance is limited by the Kerr effect. The Kerr effect is caused by the different phase shifts between counter propagating beams due to the self-phase modulation (SPM) and cross-phase modulation (XPM) and is more prominent with narrow linewidth lasers.

The Kerr bias becomes more significant in integrated photonics gyroscopes. Due to the small scale factor, or sensitivity rotation rate, photonics gyroscopes must have very high finesses to reduce the cavity linewidth and increase the gyroscope sensitivity. Therefore, the intracavity intensity of photonics gyroscopes is much higher than the intensity in traditional resonant fiber optical gyroscopes, leading to stronger Kerr effect.

SUMMARY

A photonics gyroscope comprises a light source on a photonics chip, the light source configured to emit a light beam with a broadband spectrum; a waveguide resonator on the photonics chip, the waveguide resonator in optical communication with the light source; a reflective component on the photonics chip and in optical communication with the waveguide resonator; a first optical detector on the photonics chip and in optical communication with the waveguide resonator; a second optical detector on the photonics chip and operatively coupled to the light source; a relative intensity noise (RIN) servo loop coupled between an output of the second optical detector and an input of the light source; and a rate calculation unit configured to receive a signal output from the first optical detector, the rate calculation unit operative to calculate a rotation rate signal for the photonics gyroscope. The light beam from the light source is directed into the waveguide resonator such that the light beam propagates in a counterclockwise (CCW) direction as a CCW beam in the waveguide resonator. A beam portion of the CCW beam is coupled out of the waveguide resonator toward the reflective component and reflected back by the reflective component as a reflected beam that is optically coupled into the waveguide resonator such that the reflected beam propagates in a clockwise (CW) direction as a CW beam in the waveguide resonator. The CW beam is coupled out of the waveguide resonator and directed to the first optical detector, which is operative to detect a resonance frequency shift between the CW and CCW beams caused by rotation of the photonics gyroscope. The RIN servo loop is configured to stabilize an intensity of the light beam emitted from the light source such that a bias error and noise in the photonics gyroscope is reduced.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
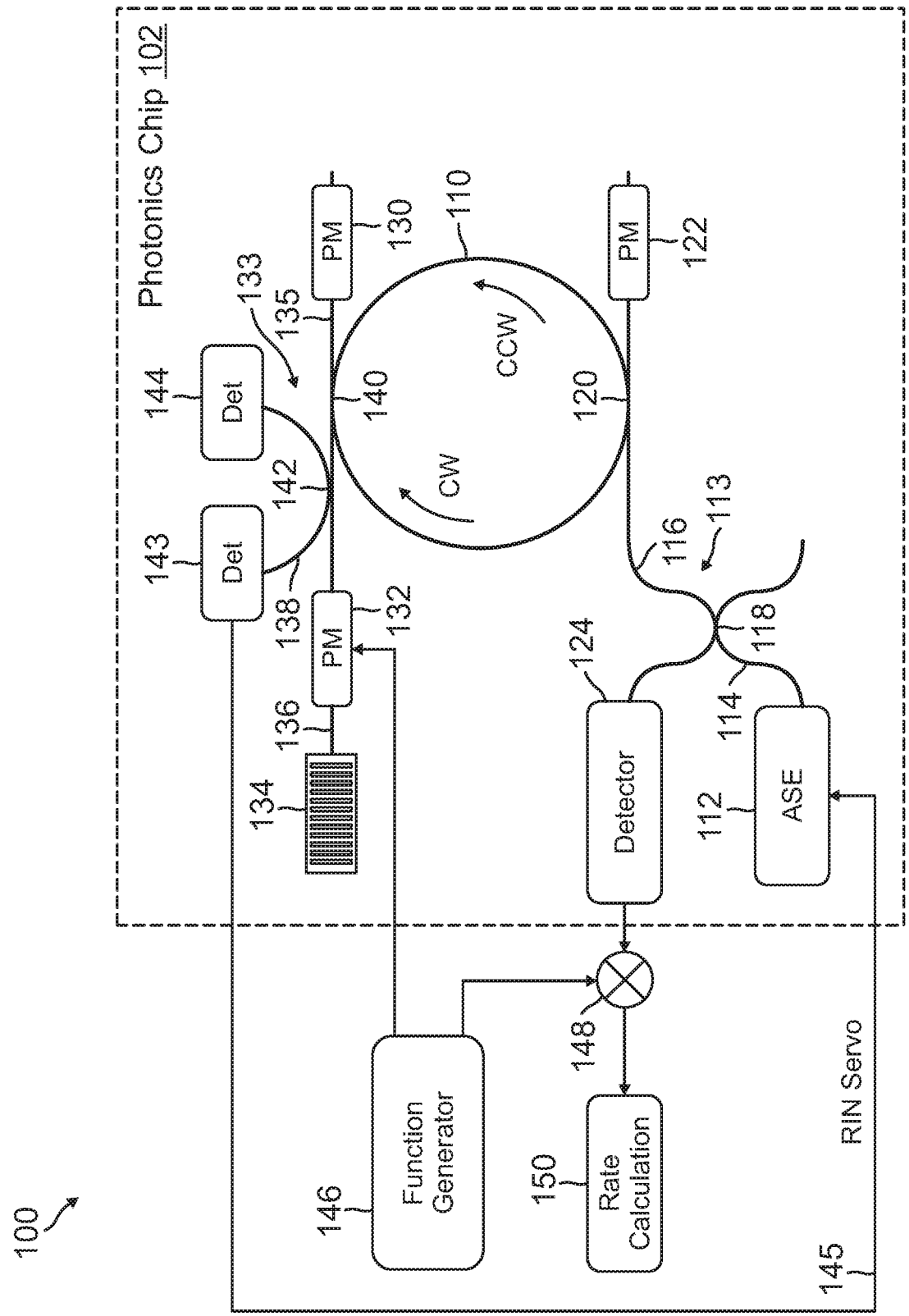
FIG. 1 is a schematic illustration of a photonics gyroscope, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Photonics gyroscopes that utilize a broadband light source are described herein. A photonics gyroscope with a broadband light source compares the intensity difference between clockwise (CW) and counterclockwise (CCW) beam transmissions. The optical power at each resonant peak is low; therefore, a typical gyroscope measurement based on one single resonance peak is limited by the shot noise. However, using the broadband light source covers a significant amount (N) of resonance peaks. The Angle Random Walk (ARW) will be reduced from the shot noise limited ARW by a factor of the square root of N. The bias due to the Kerr effect is greatly reduced due to the broadband light source.

The photonics gyroscope with a broadband light source is based on an optical waveguide resonator, such as a waveguide ring resonator, and waveguide coupler arrangements. An on-chip broadband light source, such as at least one superluminescent diode (SLD), emits a light beam that is split into two outputs via a coupler. In some embodiments, a couple of SLDs can be combined together for broader bandwidth and higher power. The light beam in one output is used for a relative intensity noise (RIN) servo loop to stabilize the light source intensity, such that a bias error and noise in the photonics gyroscope is reduced.

The light beam from the other output is launched into the waveguide resonator in a CCW direction. This CCW light beam represents the transmission spectrum of the waveguide resonator in the CCW direction. The CCW light beam is then phase modulated and reflected by a reflective component, such as a Bragg grating fabricated on a waveguide, such that the reflected beam is directed in the CW direction in the waveguide resonator.

The rotation of the photonics gyroscope causes the resonance frequency shift between CW and CCW directions. Thus, the output intensity varies with the Sagnac frequency shift. The phase modulation and demodulation process converts the intensity output from a resonance peak to a linear output. The rotation rate magnitude and direction can be calculated from components of the demodulated signal, as well as using those components to suppress effects of the phase delay error between a phase modulator and the reflective component. The linewidth of waveguide resonator can be designed to be wider than the maximum Sagnac frequency shift.

Prior approaches for resonant optical gyroscopes rely on narrow linewidth lasers and resonance locking loops for rate detection, which is complicated and expensive. The present approach reduces the complexity and cost by using the broadband light source and integrates all the optical gyroscope components on a single photonics chip. Using a broadband light source significantly reduces the bias instability due to the Kerr effect.

In addition, the present integrated photonics gyroscopes can significantly reduce size, weight, and power (SWaP) when implemented as a navigation-grade gyroscope. Also, complementary metal-oxide-semiconductor (CMOS) compatible integrated circuit manufacturing can be used to fabricate the photonics gyroscopes, providing significant cost reductions.

Further details regarding the present approach are described as follows and with reference to the drawings.

FIG. 1 is a schematic illustration of an integrated photonics gyroscope 100 according to one embodiment. The photonics gyroscope 100 generally includes a waveguide resonator 110, such as a waveguide ring resonator, which is in optical communication with a broadband light source 112 through an optical path provided by a first waveguide arrangement 113. As shown in FIG. 1, the optical components of photonics gyroscope 100 can be integrated on a single photonics chip 102.

The waveguide resonator 110 can be formed to have a large polarization dependent loss, and to intrinsically support one polarization mode, which reduces bias error and instability in photonics gyroscope 100. In one embodiment, waveguide resonator 110 can have a cavity linewidth of about 1 MHz. The light source 112 can be an amplified spontaneous emission (ASE) device, such as a superluminescent diode (SLD), which is configured to emit a light beam with a broadband spectrum. In some embodiments, two or more SLDs with different center wavelengths can be combined to increase the power and bandwidth of the ASE light.

The first waveguide arrangement 113 includes a first waveguide 114 optically coupled to an output of light source 112, and a second waveguide 116 optically coupled to waveguide resonator 110. A portion of first waveguide 114 is optically coupled to a portion of second waveguide 116 at a first coupler region 118. The second waveguide 116 is optically coupled to waveguide resonator 110 at a second coupler region 120 on a first side of waveguide resonator 110.

A first phase modulator (PM) 122 and a first optical detector 124, on photonics chip 102, are in optical communication with waveguide resonator 110 through first waveguide arrangement 113. The second waveguide 116 is optically coupled between first phase modulator 122 and an input of first optical detector 124. A second phase modulator 130 and a third phase modulator 132, on photonics chip 102, are in optical communication with waveguide resonator 110 through a second waveguide arrangement 133.

A reflective component 134, such as a Bragg grating or an edge high reflective (HR) coating on a waveguide edge, is in optical communication with waveguide resonator 110 through second waveguide arrangement 133 and third phase modulator 132. The second waveguide arrangement 133 comprises a third waveguide 135 optically coupled between second phase modulator 130 and third phase modulator 132, and a fourth waveguide 136 optically coupled between reflective component 134 and third phase modulator 132. The third waveguide 135 is optically coupled to waveguide resonator 110 at a third coupler region 140 on a second side of waveguide resonator 110. The third waveguide 135 is also optically coupled to a portion of a fifth waveguide 138 at a fourth coupler region 142. The fifth waveguide 138 is optically coupled between a second optical detector 143 and a third optical detector 144.

An output from second optical detector 143 communicates with an input of light source 112 to form a relative intensity noise (RIN) servo 145, which is configured to stabilize the intensity of the light beam emitted from light source 112. The third optical detector 144 is configured to monitor a reflected beam power.

The output of first phase modulator 122 and second phase modulator 130 can each be terminated with a large angle cleave (e.g., greater than about 10 degrees), which reduces the back reflection light. The first phase modulator 122 and second phase modulator 130 are configured to reduce the bias instability due to the back reflection light by scrambling the phase of any reflected beam to cancel out the back reflection light, which can interfere and cause bias instability in the gyroscope. In some embodiments, low frequency modulation (e.g., 100 Hz) can be used in all phase modulators to scramble the phase of the reflected beams at the phase modulators. In this way, the phase modulators are used to reduce the bias error due to parasitic light interference.

A function generator 146 is configured to output a control signal to third phase modulator 132 to impress two phase modulation waveforms at two different frequencies on the light. The first is at a modulation frequency $f_{pm}$ (e.g., about 20 kHz) and is used for rate detection, and the second is at a frequency $f_3$ (e.g., about 100 Hz) and is used to scramble the phase of the light propagated in optical paths between coupler region 140 and reflective component 134. This latter modulation suppresses the bias errors due to parasitic interference of light in those paths. A mixer 148 is configured to receive a signal (modulation frequency ($f_{pm}$)) from function generator 146 and an output signal from first optical detector 124. The mixer 148 combines the signals from function generator 146 and first optical detector 124 to produce a combined signal that is sent to a rate calculation unit 150.

As shown in FIG. 1, RIN servo 145, function generator 146, mixer 148, and rate calculation unit 150 are implemented off of photonics chip 102. In other embodiments, one or more of these electronic components can be integrated on photonics chip 102 using standard microfabrication processes.

During operation of photonics gyroscope 100, a light beam is emitted from broadband light source 112 into first waveguide 114, which directs the light beam to first coupler region 118 where the light beam is coupled into second waveguide 116. The broadband light source 112 contains (although not shown) an isolator to prevent lasing and other deleterious effects from potential optical feedback. The light beam is directed by second waveguide 116 to second coupler region 120, which couples the light beam into waveguide resonator 110 in a CCW direction as a CCW beam. Any light not coupled into waveguide resonator 110 is directed by second waveguide 116 to first phase modulator 122, which scrambles the phase of this light to cancel out any back reflection of the light.

A beam portion of the CCW beam in waveguide resonator 110 is optically coupled into third waveguide 135 at third coupler region 140. The transmitted beam portion is phase modulated by third phase modulator 132 and directed to reflective component 134 through fourth waveguide 136. The reflective component 134 reflects the beam portion back through fourth waveguide 136, to third phase modulator 132, and into third waveguide 135. Some of the reflected beam portion is optically coupled at third coupler region 140 into waveguide resonator 110 in a CW direction as a CW beam. The remainder of the reflected beam portion in third waveguide 135 is directed to second phase modulator 130, which scrambles the phase of the reflected beam portion to cancel out any errors due to back reflected light.

In addition, some of the CCW light in third waveguide 135 is tapped into fifth waveguide 138 at fourth coupler region 142 and directed to second optical detector 143. Also, some of the reflected light in third waveguide 135 is tapped into fifth waveguide 138 at fourth coupler region 142 and directed to third optical detector 144. A corresponding electrical signal is sent from second optical detector 143 to an input of light source 112 to provide a feedback loop for RIN servo 145, which stabilizes an intensity of the light beam emitted from light source 112. In one embodiment, RIN servo 145 can stabilize the ASE intensity in a range from about 20 KHz to about 20 MHz. The third optical detector 144 uses the reflected light in fifth waveguide 138 to monitor the reflected beam power, which is the intensity of the CW beam coupled into waveguide resonator 110 and can be used for scale factor calibration or compensation.

The CW beam is coupled out of waveguide resonator 110 at second coupler region 120 into second waveguide 116, and the CW beam is directed to first optical detector 124. The rotation of photonics gyroscope 100 causes a resonance frequency shift between the CW and CCW beams output by waveguide resonator 110, which is detected by first optical detector 124. The first optical detector 124 outputs a corresponding electrical signal that is demodulated at $f_m$ in mixer 148, which outputs a signal that is sent to rate calculation unit 150 for further processing to determine a rotation rate.

The output intensity varies with the Sagnac frequency shift. The phase modulation and demodulation process convert the intensity output from a resonance peak to a linear output. The rotation rate magnitude and direction can be calculated from components of the demodulated signal, as well as using those components to suppress effects of the phase delay variations between phase modulator 132 and reflective component 134.

Figure 2:
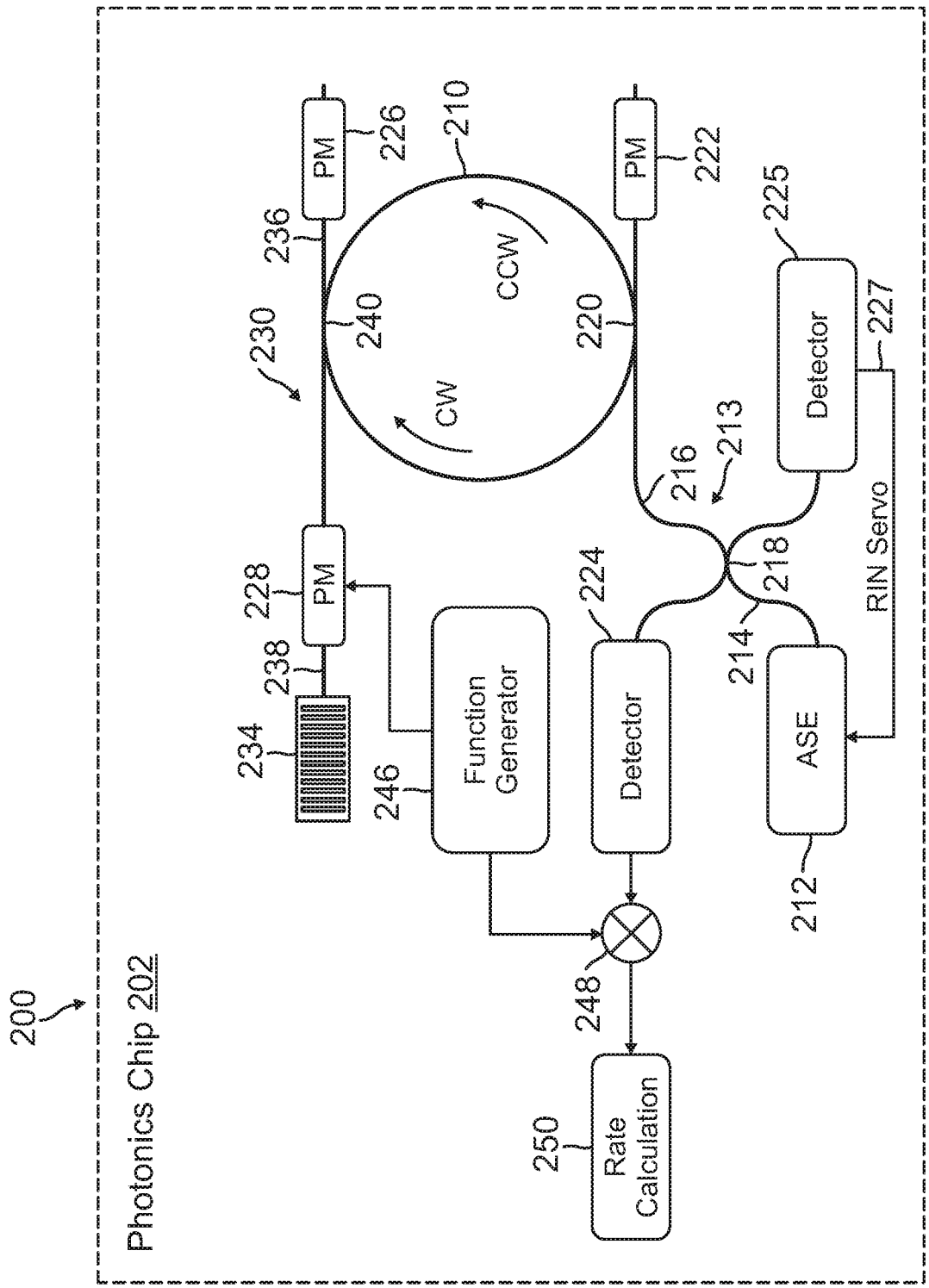
FIG. 2 is a schematic illustration of a photonics gyroscope, according to another embodiment.

FIG. 2 is a schematic illustration of an integrated photonics gyroscope 200 according to another embodiment. The photonics gyroscope 200 generally includes a waveguide resonator 210, such as a waveguide ring resonator, which is in optical communication with a broadband light source 212 through an optical path provided by a first waveguide arrangement 213. Each of the components of photonics gyroscope 200 can be integrated on a single photonics chip 202.

The waveguide resonator 210 can be formed to have a large polarization dependent loss, and to intrinsically support one polarization mode, which reduces bias error and instability in photonics gyroscope 200. The light source 212 can be an ASE device, such as at least one SLD, which is configured to emit a light beam with a broadband spectrum.

The first waveguide arrangement 213 includes a first waveguide 214 optically coupled to an output of light source 212, and a second waveguide 216 optically coupled to waveguide resonator 210. A portion of first waveguide 214 is optically coupled to a portion of second waveguide 216 at a first coupler region 218. The second waveguide 216 is optically coupled to waveguide resonator 210 at a second coupler region 220 on a first side of waveguide resonator 210.

A first phase modulator (PM) 222 and a first optical detector 224, on photonics chip 202, are in optical communication with waveguide resonator 210 through first waveguide arrangement 213. The second waveguide 216 is optically coupled between first phase modulator 222 and an input of first optical detector 224.

A second optical detector 225 on photonics chip 202 is operatively coupled to light source 202. The first waveguide 214 is optically coupled between light source 214 and second optical detector 225. An output from second optical detector 225 communicates with an input of light source 212 to form a RIN servo 227, which is configured to stabilize an intensity of the light beam emitted from light source 212.

A second phase modulator 226 and a third phase modulator 228, on photonics chip 202, are in optical communication with waveguide resonator 210 through a second waveguide arrangement 230. A reflective component 234, such as a Bragg grating or an edge HR coating on a waveguide edge, is in optical communication with waveguide resonator 210 through second waveguide arrangement 230 and third phase modulator 228. The second waveguide arrangement 230 comprises a third waveguide 236 optically coupled between second phase modulator 226 and third phase modulator 228, and a fourth waveguide 238 optically coupled between reflective component 234 and third phase modulator 228. The third waveguide 236 is optically coupled to waveguide resonator 210 at a third coupler region 240 on a second side of waveguide resonator 210.

The output of first phase modulator 222 and second phase modulator 226 can each be terminated with a large angle cleave (e.g., greater than about 10 degrees), which reduces the back reflection light. The first phase modulator 222 and second phase modulator 226 are configured to reduce the bias instability due to the back reflection light by scrambling the phase of any reflected beam to cancel out the back reflection light, which can interfere and cause some bias. In some embodiments, a low frequency modulation (e.g., about 100 Hz) can be used in all the phase modulators to scramble the phase of the reflected beams at the phase modulators. The allows the phase modulators to reduce the bias error due to parasitic interference.

A function generator 246 on photonics chip 202 is configured to send a control signal to third phase modulator 228 to impress two phase modulation waveforms at two different frequencies on the light. The first is at a modulation frequency $f_{pm}$ (e.g., about 20 kHz) and is used for rate detection, and the second is at a frequency $f_3$ (e.g., about 100 Hz) and is used to scramble the phase of the light propagated in optical paths including waveguide arrangement 230, phase modulator 228, and reflective component 234. This latter modulation suppresses the bias errors due to parasitic interference of light in those paths. A mixer 248 on photonics chip 202 is configured to receive a signal (modulation frequency ($f_{pm}$)) from function generator 248 and an output signal from first optical detector 224. The mixer 248 combines the signals from function generator 246 and first optical detector 224 to produce a combined signal. A rate calculation unit 250 on photonics chip 202 is configured to receive the combined signal from mixer 248. The rate calculation unit 250 is operative to calculate a rotation rate signal for photonics gyroscope 200.

As shown in FIG. 2, RIN servo 227, function generator 246, mixer 248, and rate calculation unit 250 are located on photonics chip 202. In other embodiments, one or more of these electronic components can be implemented off of photonics chip 202.

During operation of photonics gyroscope 200, a light beam is emitted from light source 212 into first waveguide 214, which directs the light beam to first coupler region 218 where a first portion of the light beam is coupled into second waveguide 216. A second portion of the light beam continues in first waveguide 214 and is directed to an input of second detector 225. The first portion of the light beam is directed by second waveguide 216 to second coupler region 220, which couples the light beam into waveguide resonator 210 in a CCW direction as a CCW beam. Any light not coupled into waveguide resonator 210 is directed by second waveguide 216 to first phase modulator 222, which scrambles the phase of this light to cancel out any back reflection of the light.

As mentioned above, a second portion of the light beam from light source 212 is directed to an input of second detector 225. A corresponding electrical signal is sent from second optical detector 225 to an input of light source 212 to provide a feedback loop for RIN servo 227, which stabilizes the intensity of the light beam emitted from light source 212. In one embodiment, RIN servo 227 can have noise-reduction in a region around a modulation frequency $f_{pm}$, potentially chosen to be anywhere in a frequency range from about 20 KHz to about 20 MHz.

A beam portion of the CCW beam in waveguide resonator 210 is optically coupled into third waveguide 236 at third coupler region 240. The beam portion is phase modulated by third phase modulator 228 and directed to reflective component 234 through fourth waveguide 238. The reflective component 234 reflects the beam portion back through fourth waveguide 238, to third phase modulator 228, and into third waveguide 236. Some of the reflected beam portion is optically coupled at third coupler region 240 into waveguide resonator 210 in a CW direction as a CW beam. The remainder of the reflected beam portion in third waveguide 136 is directed to second phase modulator 226, which scrambles the phase of the reflected beam portion to cancel out any errors due to back reflected light.

The CW beam is coupled out of waveguide resonator 210 at second coupler region 220 into second waveguide 216, and the CW beam is directed to first optical detector 224. The rotation of photonics gyroscope 200 causes a resonance frequency shift between the CW and CCW beams output by waveguide resonator 210, which is detected by first optical detector 224. The first optical detector 224 outputs a corresponding electrical signal that is demodulated at $f_m$ in mixer 248, which outputs a signal that is sent to rate calculation unit 250 for further processing to determine a rotation rate.

The output intensity varies with the Sagnac frequency shift. The phase modulation and demodulation process convert the intensity output from a resonance peak to a linear output. The rotation rate magnitude and direction can be calculated from components of the demodulated signal, as well as using those components to suppress effects of the phase delay between phase modulator 228 and reflective component 234.

Example Embodiments

Example 1 includes a photonics gyroscope, comprising: a light source on a photonics chip, the light source configured to emit a light beam with a broadband spectrum; a waveguide resonator on the photonics chip, the waveguide resonator in optical communication with the light source; a reflective component on the photonics chip and in optical communication with the waveguide resonator; a first optical detector on the photonics chip and in optical communication with the waveguide resonator; a second optical detector on the photonics chip and operatively coupled to the light source; a relative intensity noise (RIN) servo loop coupled between an output of the second optical detector and an input of the light source; and a rate calculation unit configured to receive a signal output from the first optical detector, the rate calculation unit operative to calculate a rotation rate signal for the photonics gyroscope; wherein the light beam from the light source is directed into the waveguide resonator such that the light beam propagates in a counterclockwise (CCW) direction as a CCW beam in the waveguide resonator; wherein a beam portion of the CCW beam is coupled out of the waveguide resonator toward the reflective component and reflected back by the reflective component as a reflected beam that is optically coupled into the waveguide resonator such that the reflected beam propagates in a clockwise (CW) direction as a CW beam in the waveguide resonator; wherein the CW beam is coupled out of the waveguide resonator and directed to the first optical detector, which is operative to detect a resonance frequency shift between the CW and CCW beams caused by rotation of the photonics gyroscope; wherein the RIN servo loop is configured to stabilize an intensity of the light beam emitted from the light source such that a bias error and noise in the photonics gyroscope is reduced.

Example 2 includes the photonics gyroscope of Example 1, wherein the light source comprises an amplified spontaneous emission device, a superluminescent diode, or two or more superluminescent diodes having different center wavelengths.

Example 3 includes the photonics gyroscope of any of Examples 1-2, wherein the waveguide resonator comprises a waveguide ring resonator.

Example 4 includes the photonics gyroscope of any of Examples 1-3, wherein the reflective component comprises a Bragg grating, or an edge high reflective coating on a waveguide edge.

Example 5 includes the photonics gyroscope of any of Examples 1-4, wherein the waveguide resonator is in optical communication with the light source through an optical path provided by a first waveguide arrangement.

Example 6 includes the photonics gyroscope of Example 5, further comprising a first phase modulator on the photonics chip and in optical communication with the waveguide resonator through the first waveguide arrangement.

Example 7 includes the photonics gyroscope of Example 6, wherein the first waveguide arrangement comprises: a first waveguide optically coupled to an output of the light source; a second waveguide optically coupled to the waveguide resonator; wherein a portion of the first waveguide is optically coupled to a portion of the second waveguide at a first coupler region; wherein the second waveguide is optically coupled to the waveguide resonator at a second coupler region on a first side of the waveguide resonator.

Example 8 includes the photonics gyroscope of Example 7, wherein the second waveguide is optically coupled between the first phase modulator and an input of the first optical detector.

Example 9 includes the photonics gyroscope of any of Examples 5-8, wherein the reflective component is in optical communication with the waveguide resonator through a second waveguide arrangement.

Example 10 includes the photonics gyroscope of Example 9, further comprising: a second phase modulator on the photonics chip and in optical communication with the waveguide resonator through the second waveguide arrangement; and a third phase modulator on the photonics chip and in optical communication with the waveguide resonator through the second waveguide arrangement.

Example 11 includes the photonics gyroscope of Example 10, further comprising: a function generator configured to send a control signal to the third phase modulator to adjust a phase modulation frequency; and a mixer configured to receive a signal from the function generator and an output signal from the first optical detector; wherein the mixer combines the signals from the function generator and the first optical detector to produce a combined signal that is sent to the rate calculation unit.

Example 12 includes the photonics gyroscope of any of Examples 10-11, wherein the second waveguide arrangement comprises: a third waveguide optically coupled between the second phase modulator and the third phase modulator; and a fourth waveguide optically coupled between the reflective component and the third phase modulator.

Example 13 includes the photonics gyroscope of any of Examples 10-12, wherein a low frequency modulation is applied to the phase modulators to scramble the phase of reflected beams at the phase modulators, thereby allowing the phase modulators to reduce the bias error due to parasitic interference.

Example 14 includes the photonics gyroscope of any of Examples 12-13, wherein the third waveguide is optically coupled to the waveguide resonator at a third coupler region on a second side of the waveguide resonator.

Example 15 includes the photonics gyroscope of any of Examples 12-14, wherein the third waveguide is optically coupled to a portion of a fifth waveguide at a fourth coupler region, the fifth waveguide optically coupled between the second optical detector and a third optical detector.

Example 16 includes the photonics gyroscope of Example 15, wherein the third optical detector is configured to monitor power of the reflected beam.

Example 17 includes the photonics gyroscope of any of Examples 7-16, wherein the first waveguide is optically coupled between the light source and the second optical detector.

Example 18 includes a photonics gyroscope, comprising: a light source on a photonics chip, the light source configured to emit a light beam with a broadband spectrum; a waveguide ring resonator on the photonics chip, the waveguide ring resonator in optical communication with the light source through an optical path provided by a first waveguide arrangement; a first phase modulator on the photonics chip and in optical communication with the waveguide ring resonator through the first waveguide arrangement; a reflective component on the photonics chip and in optical communication with the waveguide ring resonator through a second waveguide arrangement; a second phase modulator on the photonics chip and in optical communication with the waveguide ring resonator through the second waveguide arrangement; a third phase modulator on the photonics chip and in optical communication with the waveguide ring resonator through the second waveguide arrangement; a first optical detector on the photonics chip and in optical communication with the waveguide ring resonator and the first phase modulator through the first waveguide arrangement; a second optical detector on the photonics chip and operatively coupled to the light source; a relative intensity noise (RIN) servo loop coupled between an output of the second optical detector and an input of the light source; a function generator configured to send a control signal to the third phase modulator to adjust a phase modulation frequency; a mixer configured to receive a signal from the function generator and an output signal from the first optical detector, wherein the mixer is configured to combine the received signals to produce a combined signal; a rate calculation unit on the photonics chip and configured to receive the combined signal from the mixer, the rate calculation unit operative to calculate a rotation rate signal for the photonics gyroscope; wherein the light beam from the light source is directed into the waveguide ring resonator by the first waveguide arrangement such that the light beam propagates in a counterclockwise (CCW) direction as a CCW beam in the waveguide ring resonator; wherein a beam portion of the CCW beam is coupled out of the waveguide resonator into the second waveguide arrangement and toward the reflective component, which reflects the beam portion back along the second waveguide arrangement as a reflected beam that is optically coupled into the waveguide ring resonator, such that the reflected beam propagates in a clockwise (CW) direction as a CW beam in the waveguide ring resonator; wherein the CW beam is coupled out of the waveguide ring resonator into the first waveguide arrangement and directed to the first optical detector, which is operative to detect a resonance frequency shift between the CW and CCW beams caused by rotation of the photonics gyroscope; wherein the RIN servo loop is configured to stabilize an intensity of the light beam emitted from the light source such that a bias error and noise in the photonics gyroscope is reduced.

Example 19 includes the photonics gyroscope of Example 18, wherein the light source comprises an amplified spontaneous emission device, a superluminescent diode, or two or more superluminescent diodes having different center wavelengths.

Example 20 includes the photonics gyroscope of any of Examples 18-19, wherein the reflective component comprises a Bragg grating, or an edge high reflective coating on a waveguide edge.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A photonics gyroscope, comprising:
   a light source on a photonics chip, the light source configured to emit a light beam with a broadband spectrum;
   a waveguide resonator on the photonics chip, the waveguide resonator in optical communication with the light source through an optical path provided by a first waveguide arrangement comprising a first waveguide optically coupled to an output of the light source, and a second waveguide optically coupled to the waveguide resonator;
   a first phase modulator on the photonics chip and in optical communication with the waveguide resonator through the first waveguide arrangement;
   a reflective component on the photonics chip and in optical communication with the waveguide resonator;
   a first optical detector on the photonics chip and in optical communication with the waveguide resonator, wherein the second waveguide is optically coupled between the first phase modulator and an input of the first optical detector;
   a second optical detector on the photonics chip and operatively coupled to the light source; and
   a relative intensity noise (RIN) servo loop coupled between an output of the second optical detector and an input of the light source.

2. The photonics gyroscope of claim 1, wherein the light source comprises an amplified spontaneous emission device, a superluminescent diode, or two or more superluminescent diodes having different center wavelengths.

3. The photonics gyroscope of claim 1, wherein the waveguide resonator comprises a waveguide ring resonator.

4. The photonics gyroscope of claim 1, wherein the reflective component comprises a Bragg grating, or an edge high reflective coating on a waveguide edge.

5. The photonics gyroscope of claim 1, wherein:
a portion of the first waveguide is optically coupled to a portion of the second waveguide at a first coupler region; and
the second waveguide is optically coupled to the waveguide resonator at a second coupler region on a first side of the waveguide resonator.

6. The photonics gyroscope of claim 5, wherein the reflective component is in optical communication with the waveguide resonator through a second waveguide arrangement.

7. The photonics gyroscope of claim 6, further comprising:
a second phase modulator on the photonics chip and in optical communication with the waveguide resonator through the second waveguide arrangement; and
a third phase modulator on the photonics chip and in optical communication with the waveguide resonator through the second waveguide arrangement.

8. The photonics gyroscope of claim 7, further comprising:
a function generator configured to send a control signal to the third phase modulator to adjust a phase modulation frequency; and
a mixer configured to receive a signal from the function generator and an output signal from the first optical detector;
wherein the mixer combines the signals from the function generator and the first optical detector to produce a combined signal.

9. The photonics gyroscope of claim 7, wherein the second waveguide arrangement comprises:
a third waveguide optically coupled between the second phase modulator and the third phase modulator; and
a fourth waveguide optically coupled between the reflective component and the third phase modulator.

10. The photonics gyroscope of claim 7, wherein a low frequency modulation is applied to the phase modulators to scramble the phase of reflected beams at the phase modulators, thereby allowing the phase modulators to reduce the bias error due to parasitic interference.

11. The photonics gyroscope of claim 9, wherein the third waveguide is optically coupled to the waveguide resonator at a third coupler region on a second side of the waveguide resonator.

12. The photonics gyroscope of claim 9, wherein the third waveguide is optically coupled to a portion of a fifth waveguide at a fourth coupler region, the fifth waveguide optically coupled between the second optical detector and a third optical detector.

13. The photonics gyroscope of claim 12, wherein the third optical detector is configured to monitor power of the reflected beam.

14. The photonics gyroscope of claim 5, wherein the first waveguide is optically coupled between the light source and the second optical detector.

15. The photonics gyroscope of claim 1, wherein:
the light beam from the light source is directed into the waveguide resonator such that the light beam propagates in a counterclockwise (CCW) direction as a CCW beam in the waveguide resonator;
a beam portion of the CCW beam is coupled out of the waveguide resonator toward the reflective component and reflected back by the reflective component as a reflected beam that is optically coupled into the waveguide resonator such that the reflected beam propagates in a clockwise (CW) direction as a CW beam in the waveguide resonator; and
the CW beam is coupled out of the waveguide resonator and directed to the first optical detector, which is operative to detect a resonance frequency shift between the CW and CCW beams caused by rotation of the photonics gyroscope.

16. The photonics gyroscope of claim 15, wherein the RIN servo loop is configured to stabilize an intensity of the light beam emitted from the light source such that a bias error and noise in the photonics gyroscope is reduced.

17. A photonics gyroscope, comprising:
a light source on a photonics chip, the light source configured to emit a light beam with a broadband spectrum;
a waveguide ring resonator on the photonics chip, the waveguide ring resonator in optical communication with the light source through an optical path provided by a first waveguide arrangement;
a first phase modulator on the photonics chip and in optical communication with the waveguide ring resonator through the first waveguide arrangement;
a reflective component on the photonics chip and in optical communication with the waveguide ring resonator through a second waveguide arrangement;
a second phase modulator on the photonics chip and in optical communication with the waveguide ring resonator through the second waveguide arrangement;
a third phase modulator on the photonics chip and in optical communication with the waveguide ring resonator through the second waveguide arrangement;
a first optical detector on the photonics chip and in optical communication with the waveguide ring resonator and the first phase modulator through the first waveguide arrangement;
a second optical detector on the photonics chip and operatively coupled to the light source;
a relative intensity noise (RIN) servo loop coupled between an output of the second optical detector and an input of the light source;
a function generator configured to send a control signal to the third phase modulator to adjust a phase modulation frequency;
a mixer configured to receive a signal from the function generator and an output signal from the first optical detector, wherein the mixer is configured to combine the received signals to produce a combined signal; and
a rate calculation unit configured to receive the combined signal from the mixer, the rate calculation unit operative to calculate a rotation rate signal for the photonics gyroscope;
wherein the light beam from the light source is directed into the waveguide ring resonator by the first waveguide arrangement such that the light beam propagates in a counterclockwise (CCW) direction as a CCW beam in the waveguide ring resonator;
wherein a beam portion of the CCW beam is coupled out of the waveguide resonator into the second waveguide arrangement and toward the reflective component, which reflects the beam portion back along the second waveguide arrangement as a reflected beam that is optically coupled into the waveguide ring resonator, such that the reflected beam propagates in a clockwise (CW) direction as a CW beam in the waveguide ring resonator;

wherein the CW beam is coupled out of the waveguide ring resonator into the first waveguide arrangement and directed to the first optical detector, which is operative to detect a resonance frequency shift between the CW and CCW beams caused by rotation of the photonics gyroscope;

wherein the RIN servo loop is configured to stabilize an intensity of the light beam emitted from the light source such that a bias error and noise in the photonics gyroscope is reduced.

18. The photonics gyroscope of claim 17, wherein the light source comprises an amplified spontaneous emission device, a superluminescent diode, or two or more superluminescent diodes having different center wavelengths.

19. The photonics gyroscope of claim 17, wherein the reflective component comprises a Bragg grating, or an edge high reflective coating on a waveguide edge.

* * * * *